Patented Dec. 18, 1951

2,578,888

UNITED STATES PATENT OFFICE 2,578,888

EMULSION DRILLING MUD

Herman H. Kaveler, Bartlesville, Okla., assignor to Phillips Petroleum Company, a corporation of Delaware No Drawing. Application August 18, 1947,
Serial No. 769,307

26 Claims. (Cl. 252—8.5)

This invention relates to drilling fluids. In one of its more specific aspects it relates to oil-in-water emulsion base well drilling fluids. And in a still more specific aspect it relates to drilling fluids of the oil-in-water emulstion type which are stabilized by a water soluble cellulose derivative.

In the art of drilling wells to tap subterranean deposits of fluids, especially when drilling by the rotary method, it is necessary to use a drilling fluid, as is well known by those skilled in the art. The especially prepared drilling fluid must act as a liquid medium of controlled viscosity for removing the cuttings from the bore hole; it must prevent excessive amounts of fluid from flowing from the hole into surrounding formations by depositing on the wall of the hole a thin but substantially impervious filter cake; it must possess a gel structure of sufficient strength to hold in suspension all solids, particularly during any time the fluid is not circulating; it must serve as a weighting material exerting sufficient pressure to counterbalance any pressure exerted by water, gas, oil, or other fluid from the structure penetrated and to prevent caving or other intrusion into the drill hole.

These requirements have in the past been met by making a dispersion in water of suitable dissolved and suspended solids of such type and in such concentration that satisfactory weight and consistency, and necessary colloidal properties, especially solid-suspension and plastering properties, are established.

A distinct advance in the art was made by the development of the nonaqueous or oil base drilling fluids. Oils, such as selected petroleum oil fractions, blends of such fractions with asphalt or other viscous oils, residual portions of crude oil and some crude oils, may be used as the liquid medium or vehicle in the nonaqueous drilling fluids.

To meet the above mentioned requirements, oil base drilling fluids usually contain finely powdered material for increasing the weight of the mixture and for imparting colloidal and other desired properties thereto. Materials commonly used for weighting purposes include such as finely divided limestone, barite, lead sulfide, oyster shell and the like. Materials used for imparting colloidal properties include oil wettable substances such as carbon black, or other highly dispersible material such as magnesium oxide, diatomaceous earth, etc. Oil soluble metallic soaps such as metal soaps of oleic, stearic and palmitic acids have been used as dispersing agents in oil base drilling muds, as well as naphthenates of some metals.

Oil base drilling fluids, of course, may be used for drilling through heaving shale formations since there is no water present to filter through wall plastering material and cause such shales to swell and cave. However, oil base drilling fluids are considerably more expensive than aqueous fluids, as oil is more expensive than water, hence their use may be accordingly limited. And in addition, these muds do not have as great carrying power for well cuttings as do the viscous aqueous muds. When circulation of an oil base mud is stopped, the suspended well cuttings tend to drop out quickly and freeze the bit in the bottom of the drill hole. A distinct advance was made in the aqueous drilling fluid art when it was discovered that upon addition of a small quantity of a water soluble alkali metal carboxymethyl cellulose, a drilling mud having extraordinary properties resulted. Such an aqueous mud and its application in solving problems encountered in drilling wells through certain types of formations is described in an application for patent, Serial Number 549,299, filed August 12, 1944, Patent 2,425,768, August 19, 1947, and entitled "Drilling Fluids and Methods of Use."

One important advantage in the use of aqueous muds containing water soluble alkali metal carboxymethyl cellulose is that the mud can be used in wells contaminated with salt water without adversely affecting the properties of the mud. Another advantage is that water loss from the mud into the surrounding formations is low and a low water loss mud permits drilling through heaving shale or similar formation without causing such shale to swell and cave into the bore hole.

Even low water loss muds may lose considerable water in the lower sections of deep wells because of the great fluid pressure of the longer column of mud tending to extrude water into the surrounding formations. The greater the amount of water lost into the formations the greater is the thickness of the solid material attached or plastered to the walls of the drill hole. Oil base fluids containing wall building material of course lose oil to the surrounding formations in proportion to the thickness of the deposited wall material.

I have devised a well drilling fluid which is relatively light in weight, even when carrying solid wall building material in suspension. This new fluid because of its light weight loses less liquid in depositing the wall building material on the walls of the drill hole at any given depth than an aqueous mud.

One object of my invention is to provide a drilling fluid or mud which is light in weight and adapted to lose a minimum of liquid in the lower depths during deposition of the wall building material.

Another object of my invention is to provide a drilling fluid of light weight per unit of volume in comparison to the weight of an equal volume of conventional drilling fluids.

Another object of my invention is to provide an improved light weight drilling fluid.

Another object is to provide an improved well drilling mud and methods of using the same.

Still another object of my invention is to provide a light weight drilling fluid which is less expensive than the conventional oil base drilling fluids.

Numerous other objects and advantages of my invention will be apparent to those skilled in the art upon reading the following specification and the accompanying claims.

I accomplish the above and other objects by preparing an oil-in-water emulsion stabilized by a water soluble alkali salt of an acidic cellulose derivative and using this stable emulsion as a drilling fluid. If it is desired to impart to the fluid wall building properties, clays or materials commonly used for such purposes, may be added. The viscosity of this emulsion may be increased by the adidtion of small quantities of epichlorohydrin.

In the present invention, for example, I agitate about equal parts of oil and water with one to two pounds of an alkali metal salt of carboxymethylcellulose to the barrel to form a tight emulsion. This mixing may be done at a convenient place and the emulsion transported to its place of use or it may be prepared in a mixing device over the mud pit and the emulsion allowed to fall into the pit or the emulsion may be delivered to any other part of the mud circulating system. This emulsion, so prepared, is circulated and during the drilling a new process of drilling is attained since the emulsion does not tend to wet the formations as much as does an aqueous drilling mud.

In the practice of my invention I prefer to use the sodium, potassium or the lithium salt of carboxymethylcellulose as the stabilizing agent. While the other alkali metal salts of this cellulosic compound work equally well, I prefer to use those mentioned for economic reasons.

Sodium carboxymethylcellulose (also called sodium carboxylmethyl cellulose ether or carboxymethylcellulose ether) may be obtained commercially and used as such, or the free acid, carboxymethylcellulose, may be obtained and converted to the sodium salt by neutralization of the free acid with, for example, an aqueous solution of sodium hydroxide. Carboxymethylcellulose, as its name implies, is methylcellulose which has substituted in the methyl group, a carboxyl group, and will hereinafter be designated as CMC except in the claims.

Other cellulosic derivatives having carboxyl groups or soluble salts of these may be employed as substitutes for the sodium-CMC with varying degrees of success. Among such compounds may be mentioned salts of oxidized cellulose, which oxidized cellulose base material is an oxidation product of nitrogen dioxide ($NO_2$ or $N_2O_4$) and cellulose linters; and alkali metal salts of carboxymethoxymethylcellulose $$(R\text{—}OCH_2O\ CH_2\ COOH)$$

in which R is a glucose unit of the cellulose, or alkali metal salts of carboxymethylcellulose xanthate. 

The CMC of commerce is often made for sale in three grades according to viscosity properties imparted by the sodium salt of said CMC to water in which it is dissolved, viz., low, medium and high viscosity. The viscosity properties of the medium viscosity product are usually lower than the means of the viscosities of the high and low viscosity products, conditions being equal.

In the following discussion, the letters CEC will be used to indicate the chemical name "carboxyethyl cellulose" (also called carboxyethylcellulose or carboxyethyl cellulose ether); and accordingly sodium CEC refers to the sodium salt of carboxyethyl cellulose ether. This compound is believed to have the following formula:

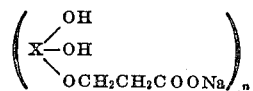

wherein X represents the glucose residue, $C_6H_7O_2$.

*Stability of oil-in-water emulsions containing various emulsifying or stabilizing agent additives*

|  | Stability After Number of Days | | | | | |
|---|---|---|---|---|---|---|
| Additive—2 lbs. per barrel | (pH 8-9) | | | (pH 7 or less) | | |
|  | 1 | 3 | 10 | 1 | 7 | 10 |
| Na-CMC-Low viscosity | Stable | Stable | Stable | Stable | Stable |  |
| Na-CMC-Medium viscosity | do | do | do | do | do |  |
| Na-CMC-High viscosity | do | do | do | do | do |  |
| Ethulose D | do | do | do | do | do |  |
| NH₄-CMC | do | do | do | do | do |  |
| Na-CEC | do | do | do | do | do | Stable. |
| CEC (free acid) |  |  |  | do |  | Do. |
| K-cellulose-sulfate | Stable | Stable | Stable | layers |  | Do. |
| NH₄-cellulose-sulfate | do |  | do | Stable |  | Do. |
| Ba cellulose sulfate |  |  |  | do |  | Do. |
| Methyl hydroxyethyl cellulose | Stable | Stable | layers |  |  |  |
| Polyvinyl Alcohol (med. vis., Type B) | do | layers |  | do |  |  |
| Na-cellulose sulfate | do |  | do | Stable |  | Do. |
| Mg-cellulose sulfate | do |  | do | layers |  |  |
| Ba-cellulose sulfate | do |  | do |  |  |  |
| Ca-cellulose sulfate | do |  | do | Stable |  | Do. |
| Ba-oxycellulose | do |  | do | do |  | layers. |
| Ca-oxycellulose | do |  | do | do |  | Do. |
| Sr-oxycellulose | do |  | do | do |  | Do. |
| Mg-oxycellulose | do |  | do | do |  | Do. |
| No additive | layers |  |  | layers |  |  |
| Polyvinyl alcohol (med. vis., Type A) | do |  |  |  |  |  |
| Na Carboxyethyl mannitol | do |  |  |  |  |  |

Reported in this example are results of the use of various cellulosic stabilizing agents and some noncellulosic materials. Some of these materials tested were soluble in water while some were not.

The muds tested were composed of a mixture of 75% by volume of a 1% suspension of bentonite in water and 25% by volume of a high flash point (180° F.) diesel fuel oil, and an additive in the concentration of 2 pounds per barrel of the mixture. These samples were stirred for 5 minutes at top speed in a laboratory Waring Blender Mixer and then poured into oil sample bottles for observation. The mud samples using the several additives were prepared, in one series in alkaline solutions of pH 8 to 9, and in a second series of pH 7 or below.

From the data in the above table it may be noted that the several Na-CMC samples gave stable emulsions in acid as well as in alkaline solutions. The ammonium-CMC and the Na-CEC gave stable emulsions in both the acids and alkaline solutions. The CEC gave an emulsion stable after 10 days in an acid solution.

It has been found that if 2 pounds of an additive gives an emulsion stable for only 1 day, 3 or 4 pounds of the additive per barrel will increase the length of the stability period.

It might be mentioned, also, in connection with the above data, that many materials which give stable emulsions for 1, 2 or 3 days only, are better stabilizing agents than one would anticipate at first thought. The reason for this is that when tests were made, a quantity of sample was prepared and poured into a bottle for observation after the elapse of the time periods. That is, the samples experienced no further agitation whatever. In practice, such muds are circulated, then may stand in the pit for a day or two, and again circulated. By continued circulation of an emulsion containing a 1-day stabilizer, the emulsion may remain stabilized for long periods of time.

It might be further pointed out that, in general, the additives which are effective in stabilizing the above oil-in-water emulsion drilling fluid are also effective in controlling, in particular, the water loss of ordinary aqueous drilling muds. Exceptions to this general rule are Mg, Ba and Ca derivatives of cellulose sulfate which satisfactorily reduce the filtration rate in aqueous drilling muds but only give temporary stability to the emulsions.

In the above table, the compounds which gave temporary stability to the emulsion showed less than 25% separation of a clear water phase over a 10 day period.

The compounds listed in the above table which gave stable emulsions were soluble in the water phase of the emulsion and those which gave temporary stability were just slightly soluble in water.

I have found that, in general, these cellulose derivatives were not soluble nor dispersible in oil.

Tests

The tests of the properties of solutions of water soluble cellulose derivatives and/or drilling fluids were all made with standard drilling mud equipment.

The measurements of pH were made with pHydrion paper. The viscosity measurements were made with a Stormer viscosimeter and reported in centipoise units. The emulsions were made by mixing the ingredients with high speed laboratory mixers, such as a Hamilton-Beach No. 33 high speed mixer.

The filter cake thickness and the water losses were determined with an "A. P. I. low pressure wall building tester filter press" with a pressure of 100 pounds per square inch applied for 30 minutes. All temperatures were approximately room temperatures unless otherwise specified. All barrels are 42 U. S. gallon barrels.

EXAMPLE I

The following experiment was carried out to determine whether or not a Na-CMC stabilized oil-in-water emulsion having desirable characteristics of a drilling fluid can be prepared using crude oil as the oil.

Two pounds per barrel of medium viscosity Na-CMC were dissolved in 75% by volume of a 1% by weight of an aqueous suspension of bentonite. To this mixture was added, with stirring, 25% of Olkahoma City field crude oil. The oil easily emulsified and yielded an emulsion having characteristics indicating suitability for use as a drilling mud. Hydrocarbon vapors were emitted at 110° F. indicating that the emulsion has a relatively low flash point.

*Properties of the crude oil-in-water emulsion*

| pH | wt., lbs. per gal. | Stormer visc., in centipoises | Initial gel., gms. | 10 min. gel., gms. | Water Loss, ml. | Cake thickness, inches |
|---|---|---|---|---|---|---|
| 7.63 | 7.5 | 111 | 0 | 0 | 8.8 | 1/32 |

EXAMPLE II

The following tests were carried out to determine the effect of calcium sulfate and of a 35–50 mixture of caustic soda and quebracho on an oil-in-water emulsion drilling fluid.

A base mud was prepared by dispersing medium viscosity Na-CMC in a 1% aqueous suspension of bentonite in the proportion of 2 pounds per barrel. To 75 parts by volume of this suspension was added 25 parts by volume of a diesel fuel oil and the mixture well stirred.

Into one portion of this base mud was incorporated 1 pound $CaSO_4$ per barrel and to another portion a 35–50 mixture of caustic soda and quebracho. Properties of the base mud (1) and of the mud containing the $CaSO_4$ (2) and the caustic soda-quebracho (3) are:

| | (1) | (2) | (3) |
|---|---|---|---|
| Weight, lbs. per gal. | 7.95 | 7.95 | 7.95 |
| Visc., cpe | 110.5 | 41.5 | 59.0 |
| Initial gel, gms. | 0 | 0 | 0 |
| 10 min. gel, gms. | 15 | 0 | 0 |
| Water Loss, ml. | 3.6 | 3.2 | 3.2 |
| Cake thickness, in. | 1/32 | 1/32 | 1/32 |
| pH | 7.5 | 8.4 | 9.0 |

It may be observed from this data that the presence of the calcium sulfate and of the caustic soda-quebracho in this emulsion mud was effective in reducing the viscosity and the 10 minute gel strength. Other properties of the base emulsion were not affected.

EXAMPLE III

As mentioned hereinbefore sodium-CMC was found to be insoluble in hydrocarbons of the diesel fuel oil boiling range. To a quantity of diesel fuel oil boiling range hydrocarbons was added a quantiy of sodium-CMC in the proportion of 1 pound of the sodium-CMC per barrel of oil. After several hours of vigorous agitation none of the sodium-CMC had been dissolved or dispersed as a base mud, diesel fuel oil was added to make an emulsion in the proportions 25% oil—75% base mud; 50% oil—50% base mud; and, 75% oil—25% base mud. Tests on these three emulsions and on the base mud are as follows:

|  | Wt., lbs. per gal. | vis., cpe. | Gel Strength | | Water Loss, ml. | Cake thickness, inches | pH[1] |
|---|---|---|---|---|---|---|---|
|  |  |  | Initial | 10 min. |  |  |  |
| Base mud | 8.6 | 19.0 | 2 | 2 | 7.9 | 2/32 | 1/32 |
| 25% oil—75% base mud | 8.1 | 59.0 | 2 | 2 | 4.1 | 1/32 | 1/32 |
| 50% oil—50% base mud | 7.55 | 560 gm. wts. | 15 | 19 | 5.9 | 1/32 | 1/32 |
| 75% oil—25% base mud | 7.33 | 900 gm. wts. | 120 | 170 | 6.9 |  | 1/32 |

[1] The pH was determined by the pHydrion paper method.

indicating therefore, that this material was quite insoluble or undispersible in that type of oil.

However, sodium-CMC will dissolve in water, or in water containing clay or in an aqueous drilling mud, or in the water phase of an oil-in-water emulsion.

EXAMPLE IV

I have found that a satisfactory procedure to follow in making such a drilling fluid is to dissolve the sodium-CMC in the water, then incorporate the oil. For example, two pounds per barrel of medium viscosity sodium-CMC was stirred into a quantity of water. Solution or dispersion was rapid. To this water solution was added 10% increments of a diesel fuel oil until the volume of the oil added equaled the original volume of the water. A semi-plastic emulsion resulted having initial and 10 minute gels of 0 and 0. The fluid weighed 7.46 pounds per gallon and gave a liquid loss test in which the entire emulsion passed through the filter at the test pressure of 100 pounds per square inch. The incorporation of some wall building material into this oil-water emulsion prevented the disperse oil phase from passing through the filter and markedly retarded the amount of water passing the filter.

EXAMPLE V

To illustrate the effect of wall building material in such an emulsion a sample of an aqueous drilling mud containing suspended wall building solids was mixed with an equal volume of water containing 2 pounds of sodium-CMC per barrel. Into this diluted mud was mixed an equal volume of a diesel fuel oil in increments of 10%. The resulting emulsion weighed 7.98 pounds per gallon, had a viscosity of 23.5 centipoises, initial and 10 minute gels of 5 and 5. The water loss test gave a filtrate of 8.0 milliliters with a filter cake thickness of 1/32 inch.

EXAMPLE VI

To prepare a drilling fluid having a water loss less than that given above, a base mud was prepared by dissolving 2 pounds per barrel of medium viscosity sodium-CMC in an aqueous 3.5% by weight bentonitic suspension containing 1 pound of lime per barrel. Using this preparation as a base mud, diesel fuel oil was added to make an emulsion in the proportions 25% oil—75% base mud; 50% oil—50% base mud; and, 75% oil—25% base mud. Tests on these three emulsions and on the base mud are as follows:

EXAMPLE VII

In an attempt to lower the water loss of this emulsion type drilling fluids, I added finely ground mica to the extent of 2 pounds per barrel of emulsion of equal volumes of a diesel fuel oil and water containing 2 pounds of medium viscosity sodium-CMC per barrel. This emulsion was sufficiently fine that the entire mass passed through the filter. The amount of mica was increased to 5 pounds per barrel thus reducing the filtrate to 8.7 ml., 10 pounds of mica per barrel gave a filtrate of 6.3 ml. One pound per barrel of a kaolin was added and gave a filtrate of 3.8 ml. Five pounds of this kaolin per barrel gave an emulsion having initial and 10 minute gels of 5 and 5, a viscosity of 120 centipoises, a filtrate of 3.7 ml. and a filter cake thickness of 1/32 inch. When the mica was increased to 15 pounds per barred the initial and 10 minute gel strengths were 5 and 7, respectively, viscosity was greater than 120 centipoises, filtrate was 4.0 ml. and the cake thickness was 1/32 inch. The conclusion drawn from these tests is that a drilling fluid having desirable characteristics may be compounded in the form of an emulsion containing diesel fuel oil and water as the two liquid phases with the sodium salt of CMC as the emulsifying agent with a finely divided solid material being added to lessen the water loss.

EXAMPLE VIII

For consideration of the fire hazard when using a hydrocarbon oil-in-water emulsion drilling fluids, flash points should be determined. When an oil having a normally high flash point is used, the oil-in-water emulsions are usually not especially hazardous. Flash points above 212° F. (the boiling point of water) are difficult to determine on account of the diluting effect of the steam. For example, a 60–40 diesel fuel oil-in-water emulsion gave no flash at 212° F. The oil itself had a Cleveland open cup flash point of 202° F.

EXAMPLE IX

To test the plasticizing effect of a fatty acid on a Na-CMC stabilized oil-in-water emulsion in the presence or absence of salt and anhydrite as contaminants, the following tests were carried out:

| Test No. | Emulsion | cpe. viscosity | Gel strength | | Water Loss, ml. | Cake thickness, inches | pH |
|---|---|---|---|---|---|---|---|
|  |  |  | Initial | 10 min. |  |  |  |
| 1 | 50-50 diesel fuel oil-in-water, 1 lb. Na-CMC/bbl | 120 | 50 | 90 | 4.0 | 1/32 | 7 |
| 2 | No. 1 + 1½ lb. stearic acid per bbl | 120 | 10 | 80 | 4.5 | 1/32 | 6 |
| 3 | No. 1 + 10% salt | 106 | 20 | 180 | 8.5 | 2/32 | 7 |
| 4 | No. 2 + 10% salt | 111 | 30 | 170 | 6.5 | 1/32 | 6 |
| 5 | No. 1 + 2 lbs/bbl anhydrite | 68.5 | 2 | 80 | 3.5 | 1/32 | 7 |
| 6 | No. 2 + 2 lbs/bbl anhydrite | 120 | 5 | 220 | 4.0 | 1/32 | 6 |

From this data it is seen that stearic acid has a marked effect on the viscosity and gel strengths, as do salt and anhydrite. The base emulsion in these tests weighed 7.55 pounds per gallon.

EXAMPLE X

Light weight drilling fluid of the herein described emulsion type is relatively light in weight when compared to aqueous muds, but these emulsions can be further lightened by incorporation of such materials as balsam wool. A base emulsion having a weight of 7.95 pounds per gallon can be lightened to 7.6 pounds per gallon by addition of 2 pounds balsam wool per barrel.

EXAMPLE XI

The viscosity and water loss of oil-in-water emulsions containing 1% bentonite in the water phase may be controlled by control of the pH of the fluid. A base emulsion consisted of 25% oil and 75% water suspension containing 1% bentonite was stabilized by 2 pounds Na-CMC per barrel. This base emulsion had a pH of 7.8 and a centipoise viscosity of 96.5. Upon decreasing the pH by addition of 1 normal hydrochloric acid, the viscosity was 92.0. By addition of 1 normal sodium hydroxide solution the viscosity decreased slowly up to a pH of 11, at a pH of 12 the viscosity dropped to about half its value at pH 11 (46 at pH 12). At pH 12.2 the viscosity was 13 and the oil and water phases separated upon standing 1 hour and 49 minutes. The water loss decreased slightly from a base mud value of 5.4 ml. to 4.6 ml. at pH 8, and then increased as pH values increased. The initial and 10 minute gel strengths were 0 at all pH values.

EXAMPLE XII

Lime was suspended in a base mud to test its ability to control the viscosity, gel strengths and water loss by control of pH. It was found that as pH increased from 8.5 to 12.2, the viscosity decreased from 41 to 15. The water loss increased, then decreased as pH of 12.2 was approached. At pH 12.2 oil and water phases separated and upon further addition of ½ pound per barrel of Na-CMC the phases reemulsified; the pH was adjusted to 12. The water loss of this latter emulsion dropped to 5.4, and the viscosity increased to 32. The initial and 10 minute gel strengths were 0 at all pH values.

EXAMPLE XIII

It was found that prolonged agitation of my oil-in-water emulsion containing bentonite stabilized by Na-CMC had an effect of lowering slightly the water loss; other properties remained constant.

Passage of natural gas through an oil-in-water emulsion containing 1% bentonite in the water phase indicated that gas passes through and escapes easily from the fluid. No permanent volume increase occurred. Thus my drilling fluid should not gas cut.

EXAMPLE XIV

The addition of 2 pounds per barrel of a Portland cement to my oil-in-water emulsion containing 1% bentonite in the water phase increased the pH from 7.2 to 10.3 and decreased the cpe. viscosity from 110.5 to 101.5. The water loss also decreased from 9.0 ml. on the base emulsion to 4.4 ml. in the presence of the cement. The gel strengths of the base fluid and of the sample containing the cement were zero. The addition of 2 pounds sodium carbonate per barrel of the cement containing emulsion increased the viscosity to 108.5 centipoises and increased the 10 minute gel strength to 85 g. The water loss was 2.8 ml.

EXAMPLE XV

While it is preferred to employ about 2 pounds per barrel of the water soluble cellulose derivative (such as sodium-CMC) as the emulsion forming agent, less may be used with a corresponding lessened effect. The use of much more than 2 pounds per barrel is not economic, as the added effect is no longer proportional to the amount added but is much less. While somewhat arbitrary limits could be set from 0.5 to 5 pounds per barrel, it is preferred to not set definite limits as with different oils, different water soluble cellulose derivatives, and different times between agitation, obviously the limits will differ. In actual use, however, no one is going to risk trouble in a well by approaching the limits, but will probably stick to about 2 pounds per barrel of the water soluble derivative, such as sodium-CMC.

As an illustration of what occurs with 0.5 pounds per barrel of sodium-CMC, the following test results are noted:

| | Wt. | Cpe. | In. Gel | 10 m. Gel | W. L. | Cake | pH |
|---|---|---|---|---|---|---|---|
| | | | | | | Inch | |
| ½#/bbl. M. V. CMC | 7.95 | 19.0 | 0 | 0 | 10.6 | ½₂ | 7.65 |
| Lime to pH 12 | | 4.5 | 0 | 0 | 10.0 | ½₂ | 12.1 |
| 1#/bbl. M. V. CMC | | 50.0 | 0 | 0 | 5.2 | ½₂ | 11.18 |
| Final pH of 12 | | 50.0 | 0 | 0 | 4.6 | ½₂ | 12.02 |

This produced an unstable emulsion but one sufficiently stable to permit well drilling operations, and with that particular oil may be regarded as substantially the lower limit. The upper limit on the amount of sodium-CMC will be set by economics as explained above.

In Example VI above, emulsions were made using 25%, 50% and 75% oil. I do not wish to limit my invention to these specific proportions of oil since with some oils it may be desirable to use less than 25% oil and with others it may be desirable to use more than 75% oil. The exact proportion of oil to use may best be determined by experiment for each specific oil and for each specific emulsifying agent.

Most of the above described tests were conducted on emulsions employing diesel fuel oil as the oil. It is not necessary to use a diesel fuel oil since many other oils form emulsions with water when stabilized with a water soluble cellulose derivative and are suitable for use as drilling fluids as herein disclosed and claimed.

While gasolines and certain naphthas will form suffifficiently stable emulsions for purposes as herein intended, the use of such oils is not recommended since emulsions of these oils with water are inflammable, and such hazard does not warrant their use.

Kerosene oils of specific gravity about 0.8 are suitable and yield stable emulsions. Oils heavier or higher boiling than kerosene, such as gas oils, distillates, diesel fuel oils and even lubricating oils may be used. As mentioned hereinbefore crude oils may also be used, but the fire hazard should be considered before using high A. P. I. gravity crude oils.

It will be realized by those skilled in the art that many conditions of these emulsions may be varied, such as the type of oil, the particular emulsifying and stabilizing agent, the ratio of oil to water, the amount of stabilizing agent per barrel, etc., and yet remain within the spirit and scope of my invention.

Having described my invention, I claim:

1. A well drilling fluid comprising an oil-in-water emulsion containing bentonite, and stabilized by an alkali metal salt of carboxymethylcellulose.

2. A well drilling fluid comprising an oil-in-water emulsion containing bentonite and calcium sulfate, and stabilized by an alkali metal salt of carboxymethylcellulose.

3. The well drilling fluid of claim 2 wherein said alkali metal salt of carboxymethylcellulose is the sodium salt of carboxymethylcellulose.

4. The well drilling fluid of claim 2 wherein said alkali metal salt of carboxymethylcellulose is potassium carboxymethylcellulose.

5. A well drilling fluid weighing 8 pounds or less per gallon comprising an oil-in-water emulsion containing a wall building material comprising inert, finally-divided, clayey solids and stabilized by a water soluble alkali salt of an acidic cellulose derivative.

6. A well drilling fluid weighing 8 pounds or less per gallon comprising an oil-in-water emulsion containing bentonite and stabilized by the sodium salt of carboxymethylcellulose.

7. A well drilling fluid weighing 8 pounds or less per gallon comprising an oil-in-water emulsion containing bentonite and balsam wool and stabilized by an alkali metal salt of carboxymethylcellulose.

8. A well drilling fluid weighing 8 pounds or less per gallon comprising an oil-in-water emulsion containing bentonite and balsam wool and stabilized by sodium carboxymethylcellulose.

9. In a process for drilling a well with well drilling tools wherein there is circulated in the well an emulsion base drilling mud containing colloidal particles of clayey material suspended in sufficient oil-in-water emulsion liquid to render the same circulatable, the method of forming a filter cake on the wall of said well to decrease the loss of fluid from said drilling mud contained therein into surrounding earthern formations which comprises dispersing oil-in-water to form an oil-in-water emulsion, adding a sufficient amount of finely divided clayey solids to form said filter cake on the wall of said well, admixing with said drilling mud and interacting therewith a water-soluble alkali salt of an acidic cellulose derivative in an amount sufficient to stabilize said emulsion and to lower the fluid loss through said filter cake but insufficient to increase the viscosity of said mud to such an extent as to render said drilling mud uncirculatable, and contacting said wall of said well with the resulting drilling mud to form said filter cake thereon.

10. In a process for drilling a well with well drilling tools wherein there is circulated in the well an emulsion base drilling mud containing colloidal particles of clayey material suspended in sufficient oil-in-water emulsion liquid to render the same circulatable, the method of forming a filter cake on the wall of said well to decrease the loss of fluid from said drilling mud contained therein into surrounding earthern formations which comprises dispersing oil-in-water to form an oil-in-water emulsion, adding a sufficient amount of finely divided clayey solids to form said filter cake on the wall of said well, admixing with said drilling mud and interacting therewith sodium carboxymethylcellulose in an amount sufficient to stabilize said emulsion and to lower the fluid loss through said filter cake but insufficient to increase the viscosity of said mud to such an extent as to render said drilling mud uncirculatable, and contacting said wall of said well with the resulting drilling mud to form said filter cake thereon.

11. A low water loss drilling fluid weighing 8 pounds or less per gallon comprising an oil-in-water emulsion stabilized by an alkali metal salt of carboxymethyl cellulose and containing a wall building material comprising inert, finely-divided, clayey solids.

12. A light-weight drilling mud comprising, in combination, sufficient inert, finely-divided solids to form a filter cake on the wall of the well, sufficient oil-in-water emulsion to maintain the mixture fluid, and a sufficient amount of a water-soluble alkali salt of an acidic cellulose derivative to stabilize said emulsion.

13. A light-weight drilling mud comprising, in combination, sufficient inert, finely-divided, clayey solids to form a filter cake on the wall of the well, sufficient oil-in-water emulsion to maintain the mixture fluid, said emulsion containing from 25 to 75 weight per cent of a high-flash point fuel oil, and a sufficient amount of a water-soluble alkali metal salt of an acidic cellulose derivative to stabilize said emulsion.

14. The composition of claim 13 wherein the stabilizer is an alkali metal salt of carboxymethylcellulose.

15. The composition of claim 13 wherein the stabilizer is sodium carboxymethylcellulose.

16. The composition of claim 13 wherein the stabilizer is an alkali metal salt of cellulose sulfuric acid 17. The composition of claim 13 wherein the stabilizer is sodium cellulose sulfate.

18. The composition of claim 13 wherein the stabilizer is an alkali metal salt of oxycellulose.

19. The composition of claim 13 wherein the stabilizer is sodium oxycellulose.

20. The process of circulating a drilling fluid in a well being drilled to form a substantially liquid-impervious sheath on the walls of the bore hole and to lubricate the bit used in drilling said well, which comprises preparing a drilling fluid of suitable viscosity for use in said drilling by forming a fluid emulsion of oil and water containing a sufficient amount of a water-soluble alkali salt of an acidic cellulose derivative to stabilize said emulsion, and a sufficient amount of finely-divided, inert solids to form a filter cake on the wall of the well, and circulating the resulting fluid through the bore hole whereby a substantially water-impervious sheath is formed on the walls of the said bore hole.

21. The process of claim 20 wherein the stabilizer is sodium carboxymethylcellulose.

22. A light-weight drilling mud comprising, in combination, sufficient inert, finely-divided clayey solids to form a filter cake on the wall of a well, sufficient oil-in-water emulsion to maintain the mixture fluid and a sufficient amount of a water-soluble alkali metal salt of a carboxyalkyl cellulose to stabilize said emulsion and to reduce the water loss due to filtration through said filter cake without increasing the viscosity of said well drilling mud to such an extent that it cannot be circulated.

23. The composition of claim 22 wherein said water-soluble alkali metal salt of a carboxylalkyl cellulose is an alkali metal carboxymethyl cellulose.

24. The composition of claim 22 wherein said water-soluble alkali metal salt of a carboxyalkyl cellulose is sodium carboxymethyl cellulose.

25. The composition of claim 22 wherein said water-soluble alkali metal salt of a carboxylalkyl cellulose is potassium carboxymethyl cellulose.

26. The composition of claim 22 wherein said water-soluble alkali metal salt of a carboxylalkyl cellulose is lithium carboxymethyl cellulose.

HERMAN H. KAVELER.

REFERENCES CITED

The following references are of record in the file of this patent:

UNITED STATES PATENTS

| Number | Name | Date |
|---|---|---|
| 2,151,029 | Henst | Mar. 21, 1939 |
| 2,216,955 | Moore | Oct. 8, 1940 |
| 2,360,992 | Weiss | Oct. 24, 1944 |
| 2,425,768 | Wagner | Aug. 19, 1947 |

OTHER REFERENCES

Hercules CMC, Bulletin published by Hercules Powder Co., Cellulose Products Department, Wilmington, Del., May 1946.

CMC, Bulletin published by Hercules Powder Co., Wilmington, Del., November 1946.